US012754109B2

(12) United States Patent
Barnes et al.

(10) Patent No.: US 12,754,109 B2
(45) Date of Patent: Oct. 6, 2026

(54) SYSTEMS AND METHODS FOR MESO-DISSECTION

(71) Applicant: Roche Molecular Systems, Inc., Pleasanton, CA (US)

(72) Inventors: Michael Barnes, Oro Valley, AZ (US); Christophe Chefd'hotel, San Jose, CA (US); Srinivas Chukka, San Jose, CA (US); Mohammad Qadri, San Ramon, CA (US)

(73) Assignee: Roche Molecular Systems, Inc., Pleasanton, CA (US)

( * ) Notice: Subject to any disclaimer, the term of this patent is extended or adjusted under 35 U.S.C. 154(b) by 361 days.

(21) Appl. No.: 18/513,779

(22) Filed: Nov. 20, 2023

(65) Prior Publication Data

US 2024/0159629 A1 May 16, 2024

Related U.S. Application Data

(63) Continuation of application No. 17/502,264, filed on Oct. 15, 2021, now Pat. No. 11,860,072, which is a (Continued)

(51) Int. Cl.
*G06K 9/00* (2022.01)
*G01N 1/28* (2006.01)
(Continued)

(52) U.S. Cl.
CPC .......... *G01N 1/286* (2013.01); *G06T 7/0014* (2013.01); *G06T 7/33* (2017.01); (Continued)

(58) Field of Classification Search
CPC .......... G01N 1/286; G01N 2001/2873; G01N 2001/383; G01N 2800/00; G06T 7/0014; (Continued)

(56) References Cited

U.S. PATENT DOCUMENTS 281,695 A 7/1883 Holcombe et al.
3,238,889 A 3/1966 Huber et al.
(Continued)

FOREIGN PATENT DOCUMENTS

AU 2002233157 A1 7/2002
CN 101018502 A 8/2007
(Continued)

OTHER PUBLICATIONS

Suarez-Quian et al., "Laser Capture Microdissection: A New Tool for the Study of Spermatogenesis," Journal of Andrology, vol. 21, No. 5, Sep./Oct. 2000.
(Continued)

*Primary Examiner* — Shervin K Nakhjavan
(74) *Attorney, Agent, or Firm* — Charney IP Law LLC; Thomas M. Finetti

(57) ABSTRACT

The subject disclosure presents systems and methods for improved meso-dissection of biological specimens and tissue slides including importing one or more reference slides with annotations, using inter-marker registration algorithms to automatically map the annotations to an image of a milling slide, and dissecting the annotated tissue from the selected regions in the milling slide for analysis, while concurrently tracking the data and analysis using unique identifiers such as bar codes.

21 Claims, 4 Drawing Sheets

Related U.S. Application Data continuation of application No. 16/550,488, filed on Aug. 26, 2019, now Pat. No. 11,181,449, which is a continuation of application No. 15/663,653, filed on Jul. 28, 2017, now Pat. No. 10,871,425, which is a continuation of application No. PCT/US2016/051895, filed on Jan. 29, 2016.

(60) Provisional application No. 62/110,476, filed on Jan. 31, 2015.

(51) Int. Cl.
*G06T 7/00* (2017.01)
*G06T 7/33* (2017.01)
*G01N 1/38* (2006.01)

(52) U.S. Cl.
CPC ................ *G01N 2001/2873* (2013.01); *G01N 2001/383* (2013.01); *G06T 2207/10056* (2013.01); *G06T 2207/30024* (2013.01)

(58) Field of Classification Search
CPC ............. G06T 7/33; G06T 2207/10056; G06T 2207/30024; G06T 2207/10064
See application file for complete search history.

(56) References Cited

U.S. PATENT DOCUMENTS 3,732,858 A 5/1973 Banko
4,320,761 A 3/1982 Haddad
4,679,446 A 7/1987 Sheehan et al.
5,218,645 A 6/1993 Bacus
5,428,690 A 6/1995 Bacus et al.
5,456,125 A 10/1995 Gagne
5,511,556 A 4/1996 DeSantis
5,817,955 A 10/1998 Gherson et al.
5,843,644 A * 12/1998 Liotta .................... G01N 1/286 436/805
5,843,657 A 12/1998 Liotta et al.
5,925,834 A 7/1999 Sgourakes
6,010,888 A 1/2000 Liotta et al.
6,135,946 A 10/2000 Konen et al.
6,161,442 A 12/2000 Sgourakes
6,204,030 B1 3/2001 Liotta et al.
6,251,516 B1 6/2001 Bonner et al.
6,342,143 B1 * 1/2002 Minden ............ G01N 27/44739 204/462
6,565,728 B1 5/2003 Kozulic
6,602,071 B1 8/2003 Shultz et al.
6,673,086 B1 1/2004 Hofmeier et al.
6,684,720 B2 2/2004 Sgourakes
6,702,990 B1 3/2004 Camacho et al.
6,750,964 B2 * 6/2004 Levenson ................. G06T 5/50 356/326
6,954,667 B2 * 10/2005 Treado ................. A61B 5/4312 600/407
7,093,508 B2 8/2006 Harris
7,185,551 B2 3/2007 Schwartz
7,473,401 B1 1/2009 Baer
7,482,169 B2 1/2009 Gjerde et al.
7,673,531 B2 3/2010 May et al.
7,794,664 B2 9/2010 Pelletier et al.
7,803,634 B2 9/2010 Klimov et al.
7,883,666 B2 2/2011 Ting et al.
7,907,259 B2 3/2011 Sagmuller et al.
7,968,819 B2 * 6/2011 Okada .................. B23K 26/032 219/121.68
8,293,497 B2 10/2012 Schutze
8,431,078 B2 4/2013 Schutze et al.
8,501,435 B2 * 8/2013 Gustafsson ............ G01N 1/286 435/40.52
8,545,517 B2 * 10/2013 Bodduluri ................. G06T 5/50 700/259
8,668,872 B2 3/2014 Klimov et al.
8,718,350 B2 * 5/2014 Metzger ................ G06T 7/0012 506/26
8,870,788 B2 10/2014 Pesce et al.
9,028,757 B2 5/2015 Klimov et al.
9,101,351 B2 8/2015 Thompson et al.
9,200,989 B2 12/2015 Niehren
9,547,898 B2 * 1/2017 Häll ...................... G06T 7/0012
10,156,501 B2 * 12/2018 Baer .................... G01B 11/002
10,650,221 B2 * 5/2020 Chukka ................. G06T 7/0012
2002/0081015 A1 * 6/2002 Alkemper ............ G02B 21/367 382/141
2002/0091441 A1 * 7/2002 Guzik ................... A61F 2/2415 623/901
2002/0108857 A1 8/2002 Paschetto et al.
2002/0134175 A1 9/2002 Mehra et al.
2003/0179916 A1 9/2003 Magnuson et al.
2004/0053326 A1 3/2004 Emmert-Buck et al.
2004/0085443 A1 * 5/2004 Kallioniemi ......... G06V 20/693 348/135
2004/0142488 A1 7/2004 Gierde et al.
2005/0042692 A1 * 2/2005 Star ...................... G01N 33/533 435/7.2
2005/0175511 A1 8/2005 Cote et al.
2005/0250211 A1 11/2005 Reinhardt et al.
2006/0074346 A1 4/2006 Hibner
2006/0139621 A1 * 6/2006 Baer .................... G01N 1/2813 356/36
2006/0243110 A1 11/2006 Ostermann et al.
2007/0066967 A1 * 3/2007 Sieckmann .......... G02B 21/365 606/13
2007/0086917 A1 4/2007 Lemme et al.
2007/0271179 A1 11/2007 Kubota
2008/0019878 A1 1/2008 Trump
2008/0148913 A1 6/2008 Chen et al.
2008/0161842 A1 7/2008 Ting et al.
2008/0235055 A1 9/2008 Mattingly et al.
2009/0226059 A1 * 9/2009 Levenson ................ G01N 1/30 382/128
2010/0000383 A1 * 1/2010 Koos .................... G02B 21/367 382/128
2010/0093023 A1 * 4/2010 Gustafsson ............ G01N 1/286 435/40.52
2010/0145326 A1 6/2010 Hoey et al.
2011/0104642 A1 5/2011 Luksch et al.
2011/0194749 A1 * 8/2011 Morris ..................... G01N 1/30 435/40.52
2011/0224574 A1 * 9/2011 Sadler ................ G01N 33/5091 600/562
2012/0045790 A1 * 2/2012 Van Dijk ................. G01N 1/04 382/128
2013/0344500 A1 * 12/2013 Trautman ............... G02B 21/34 435/7.1
2014/0098214 A1 * 4/2014 Schlaudraff .......... G01N 1/2813 348/79
2014/0124367 A1 * 5/2014 Takeuchi ................ H01J 37/16 204/298.31
2014/0140607 A1 * 5/2014 Erjefalt ................ G06V 20/695 382/133
2014/0329269 A1 * 11/2014 Adey ....................... G01N 1/04 435/309.1
2014/0348410 A1 * 11/2014 Grunkin ................ G06T 7/0012 382/133
2014/0356876 A1 * 12/2014 Ragan .................... C12Q 1/686 435/7.1
2015/0136977 A1 * 5/2015 Buxbaum ........... H01J 37/3056 250/307
2015/0262329 A1 * 9/2015 Vink ........................ G01N 1/28 435/6.11
2015/0316478 A1 11/2015 Klimov et al.
2015/0317509 A1 * 11/2015 Kil ............................ G06T 7/11 382/133
2015/0347505 A1 * 12/2015 Ohashi .................... G06F 18/40 707/754
2016/0116729 A1 * 4/2016 Casas ................... G02B 21/362 348/80

(56) References Cited

U.S. PATENT DOCUMENTS

| | | | | |
|---|---|---|---|---|
| 2016/0377546 A1* | 12/2016 | Ragan | G01N 21/6458 250/459.1 |
| 2017/0322124 A1* | 11/2017 | Barnes | G06T 7/0014 |
| 2017/0328817 A1 | 11/2017 | Barnes et al. | |
| 2018/0025210 A1* | 1/2018 | Remiszewski | G06F 18/217 382/133 |
| 2018/0149561 A1* | 5/2018 | Schlaudraff | G02B 21/32 |
| 2018/0225872 A1* | 8/2018 | Vink | G06T 7/0012 |
| 2018/0340870 A1* | 11/2018 | Gustafson | C12Q 1/6886 |

FOREIGN PATENT DOCUMENTS

| | | | | |
|---|---|---|---|---|
| CN | 101267546 A | 9/2008 | |
| CN | 201262598 Y | 6/2009 | |
| CN | 101543413 A | 9/2009 | |
| CN | 103384818 A | 11/2013 | |
| CN | 102525597 B | 12/2013 | |
| CN | 103443609 B | 1/2016 | |
| DE | 19818425 A1 | 7/1999 | |
| EP | 1067374 B1 | 3/2013 | |
| EP | 1969340 B1 | 7/2019 | |
| JP | S62292144 A | 12/1987 | |
| JP | H07184908 A | 7/1995 | |
| JP | 2001500772 A | 1/2001 | |
| JP | 2001041864 A | 2/2001 | |
| JP | 2004069666 A | 3/2004 | |
| JP | 2004258017 A | 9/2004 | |
| JP | 2006506672 A | 2/2006 | |
| JP | 2006518654 A | 8/2006 | |
| JP | 2007209360 A | 8/2007 | |
| JP | 2007286697 A | 11/2007 | |
| JP | 2009103701 A | 5/2009 | |
| JP | 2010267092 A | 11/2010 | |
| JP | 2012198234 A | 10/2012 | |
| JP | 2013506835 A | 2/2013 | |
| JP | 5215969 B2 | 6/2013 | |
| JP | 2013178825 A | 9/2013 | |
| JP | 2013195133 A | 9/2013 | |
| JP | 2013245988 A | 12/2013 | |
| JP | 2013245998 A | 12/2013 | |
| JP | 2014504728 A | 2/2014 | |
| KR | 100271053 B1 | 11/2000 | |
| KR | 20020085123 A | 11/2002 | |
| KR | 20050027607 A | 3/2005 | |
| KR | 20050027609 A | 3/2005 | |
| WO | 2000057153 A1 | 9/2000 | |
| WO | 2002037159 A2 | 5/2002 | |
| WO | 2002057746 A2 | 7/2002 | |
| WO | 2004045768 A1 | 6/2004 | |
| WO | 2006011510 A1 | 2/2006 | |
| WO | 2006123967 A2 | 11/2006 | |
| WO | 2007076934 A1 | 7/2007 | |
| WO | 2008156566 A1 | 12/2008 | |
| WO | 2009008843 A1 | 1/2009 | |
| WO | WO-2009086521 A2 * | 7/2009 | G01N 1/2813 |
| WO | 2010093861 A2 | 8/2010 | |
| WO | 2010125495 A2 | 11/2010 | |
| WO | 2012102779 A2 | 8/2012 | |
| WO | 2012115948 A1 | 8/2012 | |
| WO | 2012102779 A3 | 9/2012 | |
| WO | 2014140070 A2 | 9/2014 | |
| WO | 2014140070 A3 | 11/2014 | |
| WO | 2016120433 A1 | 8/2016 | |
| WO | 2020057746 A1 | 3/2020 | |

OTHER PUBLICATIONS

Walker et al., "Quantitative PCR for DNA identification absed on genome-specific interspersed repetitive elements," Genomics 83 (2004) 518-527.

Moelans et al., "HER-2/neu amplification testing in breast cancer by Multiplex Ligation-dependent Probe Amplification: influence of manual- and laser microdissection," BMC Cancer 2009, 9:4.

Adey, N. et al.; "A mill based instrument and software system for dissecting slide-mounted tissue that provides digital guidance and documenation" BMC Clinical Pathology, (2013) p. 29; vol. 13 No. 1.

Beltinger et al.; A simple combined microdissection and aspiration device for the rapid procurement of single cells from clinical peripheral blood smears; Molecular Pathology; 1998; pp. 233-236; vol. 51.

De Bruin et al; Macrodissection versus microdissection of rectal carcinoma: minor influence of stroma cells to tumor cell gene expression profiles; BMC Genomics; Oct. 14, 2005; 10 pages; vol. 6, No. 142; BioMed Central.

Extended European search report issued Aug. 29, 2017, in EP Application No. EP 11 85 7029, filed Nov. 16, 2011, 11 pages.

Going et al.; Practical histological microdissection for PCR analysis; The Journal of Pathology; May 1996; pp. 121-124; vol. 179, Issue 1; John Wiley & Sons, Ltd.

Going; Histological microdissection in diagnostic and investigative pathology; Diagnostic Histopathology; Jan. 2010; pp. 43-48; vol. 16, Issue 1; Elsevier.

Hernandez et al.; Manual versus laser micro-dissection in molecular biology; Ultrastructural Pathology; 2006; pp. 221-228; vol. 30, No. 3; Informa Healthcare.

http://en.nanotec.com/hollowshaft_steppermotors.html.

http://www.andrologyjournal.org/cgi/reprint/21/5/601.pdf.

http://www.dell.com/us/p/inspiron-mini1018/pd?refid+inspiron-1018&s=dhs&cs=19.

http://www.dino-lite.com.

http://www.etaluma.com/Index.php.

http://www.griffinmotion.com/product-detail.asp?productid=20.

http://www.micromark.com/MicroLux-Micro-Milling-Machine.9683.html.

http://www.ncbi.nim.nih.gov/pmc/articles/PMC2631004.

http://www.ncbi.nlm.nih.gov/pubmed/_12711348.

http://www.rolynoptics.thomasnet.com/item/d-microscope-sections-microscope-stages-and-mounts//mechanical-stage/80-5166-id-1769-?.

International Search Report and Written Opinion mailed on Jan. 29, 2016 in corresponding PCT/EP2016/051895 filed on Jan. 29, 2016, pp. 1-11.

International Search Report and Written Opinion mailed on Feb. 9, 2018 in corresponding PCT/EP2017/078623 filed on Nov. 8, 2017, pp. 1-13.

International Search Report and Written Opinion, dated May 2, 2016 for PCT/EP2016/051894.

Japanese office action dispatched on Aug. 23, 2018 in corresponding Japanese patent application No. 2017-539656.

Lee et al.; A simple, precise and economical microdissection technique for analysis of genomic DNA from archival tissue sections; Oct. 1998; pp. 305-309; vol. 433, Issue 4; Springer-Verlag.

Linton et al.; Preparation of formalin-fixed paraffin-embedded (FFPE) tissue for RNA extraction; BioTechniques; Nov. 2009; p. 54.

Martin et al.; Differences in the Tumor Microenvironment between African-American and European-American Breast Cancer Patients; PLoS One; Feb. 2009; 14 pages; vol. 4, Issue 2; www.plosone.org.

Office Action for Chinese application 201180069499.6 dated Jul. 10, 2015, 6 pages including English Translation.

Office Action for Chinese application 201180069499.6 dated Oct. 10, 2015, 4 pages including English Translation.

Office Action for Chinese application 201180069499.6 dated Oct. 20, 2014, 20 pages including English Translation.

PCT Application PCT/US2011/061075; Filing date Nov. 16, 2011; Adey Nils B et al.; International Search Report mailed Jul. 18, 2012.

Quistorff et al.; Simple Techniques for Freeze Clamping and for Cutting and Milling of Frozen Tissue at Low Temperature for the Purpose of Two- or Three-Dimensional Metabolic Studies in Vivo; Analytical Biochemistry; 1980; pp. 237-248; vol. 108; Academic Press, Inc.

Sarkar et al.; "A Robust Method for Inter-Marker Whole Slide Registration of Digital Pathology Images Using Lines Based Features" 11th International Symposium on Biomedical Imaging; Jul. 31, 2014.

(56) References Cited

OTHER PUBLICATIONS

Walker, et al.: Quantatative PCR for DNA identification based on genome-specific interspersed repetitive elements; Genomics; 2004; pp. 518-527; vol. 83; Elsevier.

* cited by examiner

SYSTEMS AND METHODS FOR MESO-DISSECTION

CROSS-REFERENCE TO RELATED APPLICATIONS

This application is a continuation of U.S. patent application Ser. No. 17/502,264 filed on Oct. 15, 2021, which application is a continuation of U.S. patent application Ser. No. 16/550,488 filed on Aug. 26, 2019, which application is a continuation of U.S. patent application Ser. No. 15/663,653 filed on Jul. 28, 2017, which is a continuation of International Patent Application No. PCT/EP2016/051895 filed on Jan. 29, 2016, which application claims the benefit of the filing date of U.S. Provisional Patent Application No. 62/110,476 filed on Jan. 31, 2015, the disclosures of which are each hereby incorporated by reference herein in their entireties.

FIELD OF THE SUBJECT DISCLOSURE

The present subject disclosure relates to imaging for medical diagnosis. More particularly, the present subject disclosure relates to automated micro-dissection (meso-dissection) of tissue specimens using reference images.

BACKGROUND OF THE SUBJECT DISCLOSURE

In the analysis of biological specimens such as tissue sections, blood, cell cultures and the like, biological specimens are mounted on a slide, stained with one or more combinations of stain and biomarkers, and the resulting assay is viewed or imaged for further analysis. Observing the assay enables a variety of processes, including diagnosis of disease, assessment of response to treatment, and development of new drugs to fight disease. An assay includes one or more stains conjugated to an antibody that binds to protein, protein fragments, or other objects of interest in the specimen. Subsequent to staining, the assay may be imaged for further analysis of the contents of the tissue specimen. Further, an adjacent section of the tissue specimen from the same tissue block may be mounted on a second glass slide, henceforth referred to as a milling slide, and specific areas of interest may be dissected for further analysis. For instance, dissection of slide-mounted tumor samples is often used to enrich cancer cells in order to generate better signal to noise ratios in subsequent biochemical characterization. Many clinical laboratories utilize manual dissection for practical reasons and to avoid the expense and difficulties of laser microdissection systems. Unfortunately, manual methods often lack resolution and process documentation.

Existing slide-mounted tissue meso-dissection systems such as those manufactured by AvanSci Bio® (details at http://avansci-bio.com/uploads/CDP-08_MesoDissection-_System_Flyer_Revi.pdf) provide better precision than manual methods while also providing digital image guidance and electronic process documentation. A meso-dissection system may comprise a micro tissue mill that employs a specialized disposable mill bit that simultaneously dispenses liquid, cuts tissue from the slide-mounted tissue surface, and aspirates the liquid along with the displaced tissue fragments. The meso-dissection instrument also consists of an optical imaging system component—with a moving x-y stage to hold the tissue slides where one of the tissue slides, typically a H&E slide, is loaded on to the stage and imaged for the user to outline the annotations. This slide is referred to as reference slide. The tissue slide to be dissected, thus referred to as milling slide, is also loaded on the stage and live image captured for tissue extraction. These meso-dissection systems may further provide a software interface for enabling annotation of areas of interest and manually transferring annotations between the images of reference and milling slides that correspond to serially-cut tissue sections, enabling further guidance of the dissection and generation of an electronic record of the process.

Although existing meso-dissection systems are more effective than manual dissection methods and are applicable for biomarker analysis of anatomical pathology samples, they are still deficient in the areas of creating the annotations for milling, as the annotations outlined on reference slide are mapped to the milling slide through a manually interactive image alignment and annotation mapping procedure and the system does not have the capability to transfer annotations from multiple reference slides resulting in inaccuracies during scraping off tissue with raw data being corrupted with other forms of tissue versus only obtaining the tissue from a biologically specific region, and also not having the capability to accurately track the biological specimen during all components of the workflow process from the input slides to the milled output tissue and any further analysis thereof.

SUMMARY OF THE SUBJECT DISCLOSURE

The subject disclosure solves the above-identified problems by providing systems, computer-implemented methods, and clinical workflows for meso-dissection of biological specimens and tissue slides including importing one or more reference slides with annotations, using inter-marker registration algorithms to automatically map the annotations to an image of a milling slide, and dissecting the annotated tissue from the selected regions in the milling slide for analysis, while concurrently tracking the slides, data and analysis using unique identifiers such as bar codes.

In one exemplary embodiment, the subject disclosure provides a system or instrument for meso-dis section, including a processor, and a memory coupled to the processor, the memory to store computer-readable instructions that, when executed by the processor, cause the processor to perform operations comprising importing a reference image along with one or more annotations, wherein the reference image was digitized from a reference slide scanned on a whole-slide scanner and wherein the annotations were generated using a whole slide viewer interface coupled to the whole-slide scanner, and automatically registering said one or more annotations onto a live capture of a tissue specimen slide to be milled, wherein tissue is extracted from the tissue specimen slide is dissected based on the one or more annotations, resulting in a milled tissue sample.

In accordance with the embodiment, the operations may further comprise generating a milling annotation based on the one or more annotations. The operations may further comprise importing a plurality of annotated reference images. The milling annotation may further be generated based on any combination of a plurality of annotations corresponding to the plurality of annotated reference images. The operations may further comprise mapping the milling annotation back to the annotated reference image. The registering may use an inter-marker registration when the reference slide is stained differently from the tissue specimen slide. The registering may use a same-marker registration when the reference slide is either stained with the same stain as the tissue specimen slide, or when the reference slide is used as the tissue specimen slide. The one or more annotations may comprise one or more combinations of any geometrical representation depicting one or more regions of interest. The reference image may be of a different resolution than the live capture. The instrument may further comprise a tracking means for associating the one or more annotations with the milled tissue sample. The operations may further comprise associating the one or more annotations and the milled tissue sample with a biological specimen. The associating may comprise using a unique identifier at the specimen level and additionally for each tissue slide. The operations may further comprise providing a user interface to invoke automated registration algorithms, logical manipulation of annotations and adjust the registration of the one or more annotations on the live image.

In another exemplary embodiment, the subject disclosure provides a tangible non-transitory computer-readable medium to store computer-readable code that is executed by a processor to perform operations comprising generating a milling annotation for milling a tissue specimen based on a plurality of reference annotations, and milling the tissue specimen using the milling annotation, wherein the milling annotation is generated based on automatic registration of an annotation generated on an external whole-slide scanner on to a live capture of the tissue specimen. The tangible non-transitory computer-readable medium may be used in the instrument for meso-dissection as described above.

In yet another exemplary embodiment, the subject disclosure provides a tangible non-transitory computer-readable medium to store computer-readable code that is executed by a processor to perform operations comprising automatically registering a plurality of reference annotations with a live-captured image of a tissue sample to be dissected, wherein the plurality of reference annotations are imported from a whole-slide scanner, and generating a milling annotation for dissection of the tissue sample based on the results of the automatic registration. The tangible non-transitory computer-readable medium may be used in the instrument for meso-dissection as described above.

In yet another exemplary embodiment, the subject disclosure provides methods performed by said systems. Therefore, the features disclosed with regard to the systems and computer-readable mediums are understood to be disclosed with respect to the method, accordingly.

DETAILED DESCRIPTION OF THE SUBJECT DISCLOSURE

The subject disclosure provides instruments or systems, computer-implemented methods, and clinical workflows for meso-dissection of biological specimens and tissue slides including importing one or more reference slides with annotations, using inter-marker registration algorithms to automatically map the annotations to an image of a milling slide, and dissecting the annotated tissue from the selected regions in the milling slide individually or together for analysis, while concurrently tracking the data and analysis using unique identifiers such as bar codes. The tracking is enabled by electronically associating the annotations performed on the milling slide, with the milled tissue extracted from the milling slide, and as further described herein.

Figure 1:
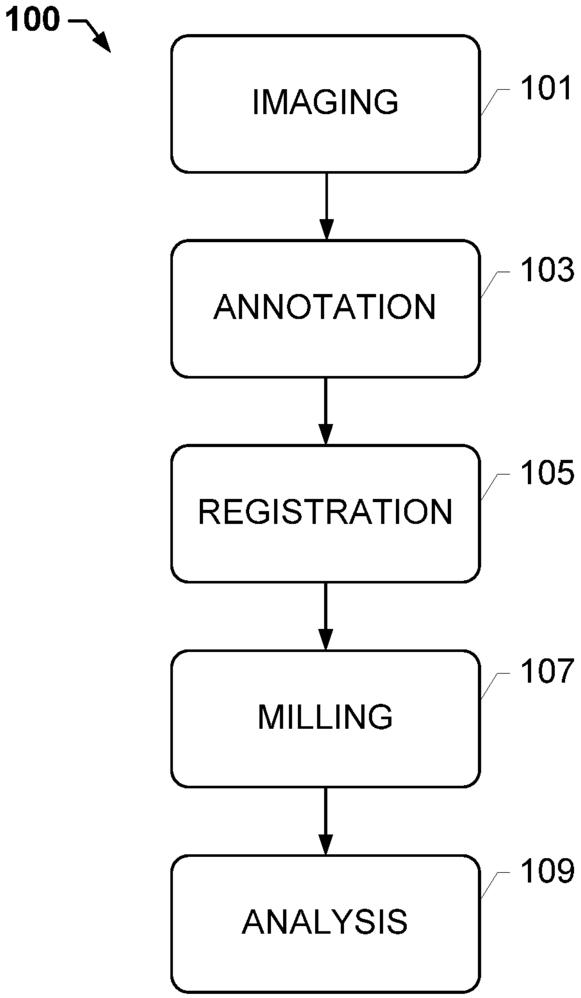
FIG. 1 depicts the main modules of a workflow for tissue analysis using meso-dissection, according to an exemplary embodiment of the subject disclosure.

FIG. 1 depicts the main modules of a workflow 100 for tissue analysis using meso-dissection. Workflow 100 may utilize a plurality of subsystems for performing operations such as a workflow for clinical digital pathology. For example, workflow 100 may include an imaging subsystem 101 for generating an image of an assay or a plurality of assays. Imaging subsystem 101 may comprise a digital microscope or a whole-slide scanner with imaging components, and may depend on the type of image being generated. For instance, the sample may have been stained by means of application of a staining assay containing one or more different biomarkers associated with chromogenic stains for brightfield imaging or fluorophores for fluorescence imaging, with imaging subsystem 101 comprising one or more of a brightfield RGB camera or other capture mechanism, or a fluorescence imaging system. Imaging subsystem 101 may further generate a plurality of images corresponding to serial sections of a tissue block, such as a biopsy taken with the intention of diagnosing a cancer, or for some other purpose. Each serial section may be mounted on an individual slide and stained with a different combination of stains and biomarkers, resulting in a plurality of images depicting adjacent tissue sections. One such image may be a Hematoxylin and Eosin (H&E) assay. Imaging subsystem 101 may also comprise a camera attached to a milling subsystem 105, as further described herein.

System 100 may further include an annotation subsystem 103 for enabling selections of annotations of portions of images acquired from imaging subsystem 101, such as areas or objects of interest. Annotations maybe performed on, for example, a reference slide image, such as an H&E slide, so as to indicate areas of interest on the H&E slide for subsequent scanning, analysis, or registration operations. Annotations may be performed automatically, i.e. by detecting regions of interest based on input from a pathologist, such as by using image analysis operations, or may be enabled by providing a user interface that depicts one or more images acquired from imaging subsystem 101 to a pathologist or other user via a user interface. For example, annotation subsystem 103 may be integrated with an imaging subsystem 101 to form a digital pathology workstation such as those commercially available today.

A registration subsystem 105 may be invoked to register or map these annotations to slides of adjacent tissue sections. For example, registration subsystem 105 may be invoked to transfer annotations from a reference slide image, such as an H&E slide, to an image of a milling slide, for example a live image of a milling slide captured on a meso-dissection system, such that areas of interest annotated on the H&E slide are dissected from the milling slide for further analysis. Registration operations may include an ability to register or transfer annotations across assays with different combinations of stains and markers, including the capability to register an image of any stained slide to an unstained slide. Such same-marker and inter-marker registration and annotations methods are further described with reference to commonly-assigned and co-pending EP patent application WO2014140070A2, the contents of which are hereby incorporated herein by reference in their entirety. Relevant sections of the incorporated patent application describe a computerized image registration process comprising selecting a first digital image of a first tissue section from a set of digital images of adjacent tissue sections of a single patient, selecting a second digital image of a second tissue section from the set, matching tissue structure between the first digital image and the second digital image, and automatically mapping an annotation drawn on the first digital image to the second digital image. The first digital image may be derived from an image obtained using a stain and an imaging mode, and the second digital image may be derived from an image obtained using a different stain, a different imaging mode, or both as compared to the first digital image. The stain may be chosen from a hematoxylin and eosin stain ('H&E' stain), an immunohistochemistry stain ('IHC" stain), or a fluorescent stain. The imaging mode may be chosen from brightfield microscopy or fluorescent microscopy. A matching tissue structure may comprise a coarse registration mode comprising: generating a first gray-level tissue foreground image from the first digital image and generating a second gray-level tissue foreground image from the second digital image, computing a first tissue binary edge map from the first gray-level tissue foreground image and computing a second tissue binary edge map from the second gray-level tissue foreground image, computing global transformation parameters to align the first binary edge map and the second binary edge map, and, mapping the first digital image and the second digital image to a common big grid encompassing both the first and second digital images based on the global transformation parameters. Computing global transformation parameters may further comprise using a moments-based mapping method to generate an affine mapping between the first binary edge map and the second binary edge map. A fine registration mode may be used to refine alignment of the first digital image and the second digital image. The fine registration mode comprises: annotating the first digital image, mapping the annotation on the common big grid to a corresponding location in the second digital image, and updating the location using Chamfer-distance matching based on the binary tissue edge maps. Cropped versions of the tissue edge binary maps may be used and the method may further comprise selecting a minimum cost window which improves matching relative to coarse mode registration.

Another exemplary registration method performed by registration subsystem 105 includes a line-based registration operation, including modeling the boundary regions of tissue samples reflected in the slides with line segments, then matching sets of line-segment between tissue samples (i.e. between slide images) to obtain an overall global transformation, i.e. coarse matching. In some embodiments, the line-based coarse matching approach is able to align images even in cases of mismatch between images (for example wear-and-tear effects, Area of Interest mismatches which can occur when the area of a physical slide picked up by the scanner for high-resolution scanning varies between adjacent sections, rotation up to 180 degrees, and horizontal and vertical flips), such as when greater than 50% of lines may be matched between the two images. In further embodiments, an additional finer sub-image registration process involving normalized, correlation-based, block matching on gradient magnitude images may be executed to compute local refinements between globally-aligned images. This registration method is further described with reference to commonly-assigned and U.S. patent application 61/885,024, the contents of which are hereby incorporated herein by reference in their entirety.

The registration methods detailed above have the generic capability to register stained (H&E, IHC etc.) or unstained slides. Any other registration method may be used so long as it provides automated mapping of annotations across images having different stains, including the capability to register stained to unstained tissue slides, in a manner that enables precise milling of areas of interest based on annotated reference slides, or enables registration of stained and unstained slides. Generally, the subject disclosure also provides an ability to scan a high-resolution reference slide and import it into existing meso-dissection systems, thereby improving the ability to and transfer annotations from high-resolution reference slides to milling annotations for a milling slide.

A milling subsystem 107 is used to mill or dissect portions of a tissue slide based on the above-described annotations. Exemplary milling subsystems are described in commonly-assigned and co-pending patent application WO 2012102779A2, the contents of which are hereby incorporated herein by reference in their entirety. In summary, this reference discloses devices, systems, and associated methods for selectively extracting a material from a sample, wherein in one aspect, for example, a method for selectively extracting a material, such as a biological material, from a sample, such as a biological sample can include identifying a region of material to be extracted from a sample, applying an extraction tool to the region of material to disrupt material from the sample, and dispensing a liquid at the region of material. The method can also include aspirating the liquid and the disrupted material from the sample.

The milling may be performed using a meso-dissection system as described herein. The meso-dissection system may include an object such as a tissue slide attached to a stage capable of controlled X and Y axis movement (i.e. an x-y stage) such that it can be driven against a fixed rotating cutting bit, thereby shaping the object. A plastic mill bit may simultaneously dispense liquid, cut tissue, and aspirate the tissue fragments from the surface of the glass slide. Because tissue is relatively soft compared to glass, a spring pressure controlled system may be used such that the blade rests on the slide surface with sufficient downward force to cut through the tissue but glides across the glass slide. Milling tissue from glass slides also provides the opportunity to place a digital microscope or camera below the slide in order to view the process, direct the dissection, and generate digital documentation. The milling subsystem 107 may include software that provides an interface to digitally indicate AOIs and save dissection reference images. Whereas prior art meso-dissection systems merely import dissection reference images in standard formats such as .jpg, .png, .bmp, etc. to provide an interface for manually guided alignment of a single reference image to the live view from a serial tissue section (milling slide) to enable transferring the areas-of-interest to overlay the live image and guide the dissection, the subject disclosure provides automated mapping of annotations from the images of reference slides to a live-capture of a milling slide using either same-marker or inter-marker registration algorithms to enable more precise dissections. The automated registration and mapping process also makes it easily possible to transfer annotations from multiple reference images. Moreover, incorporating the annotation and registration operations with the milling subsystem enables a greater range of tissue slides that may be dissected, unlike the prior art that is only discloses dissecting unstained tissue. For example, different types of stained assays may be subject to meso-dissection using reference slide annotations, and for each assay, a coverslip of the assay may be removed prior to dissection, unlike existing systems that only dissect tissue from unstained slides that do not already have coverslips attached.

Finally, analysis subsystem 109 performs analysis on the milled tissue sections. This can be any type of analysis, such as molecular (pCR, qTpCR etc.) and/or genetic sequence analysis for clinical and research purposes. Results of the analysis may be tracked using tracking mechanisms that link the annotations with the tissue sample or block that the reference and milling slides are prepared from, and pre or post-image analysis and interpretation done on the tissue slides, milled tissue and milled tissue containers, associating these with the biological specimen being analyzed, and adding the analysis results to a database associated with the biological specimen as further described with reference to FIG. 4.

Figure 2:
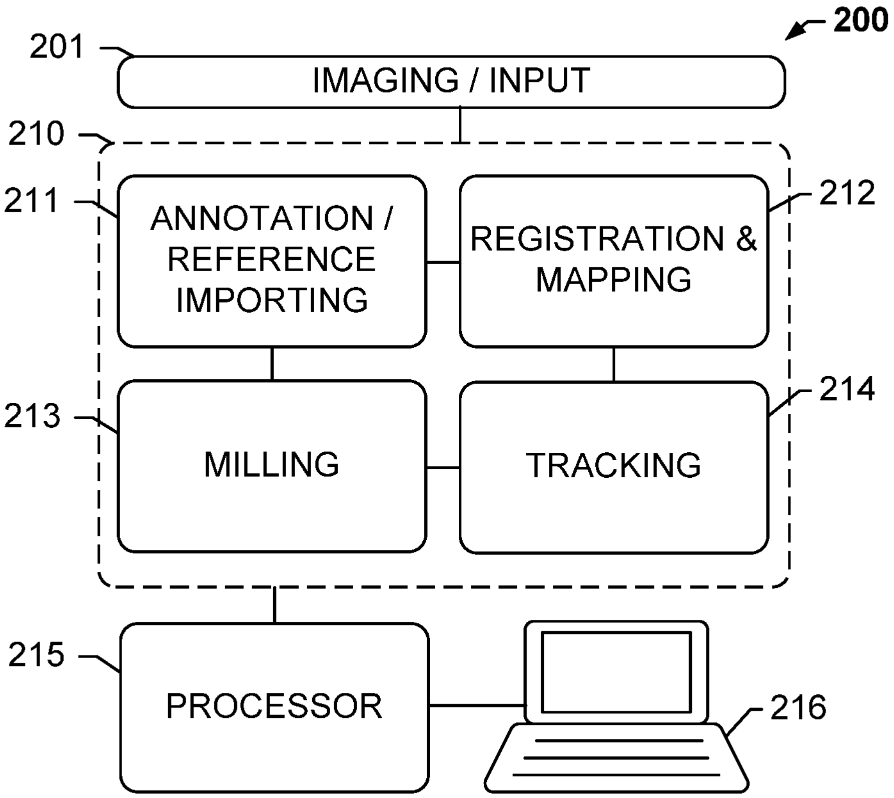
FIG. 2 depicts a system for automated meso-dissection, according to an exemplary embodiment of the subject disclosure.

FIG. 2 depicts a system 200 for automated meso-dissection, according to an exemplary embodiment of the subject disclosure. System 200 comprises a memory 210, which stores a plurality of processing modules or logical instructions that are executed by processor 215 coupled to computer 216. An input from an imaging or input module 201 may trigger the execution of one or more of the plurality of processing modules. Imaging/input module 201 may include an imaging subsystem such as subsystem 101 described with reference to FIG. 1, or may include user inputs as well as inputs supplied over a network from a network server or database for storage and later retrieval by computer 216. Besides processor 215 and memory 210, computer 216 also includes user input and output devices such as a keyboard, mouse, stylus, and a display/touchscreen. As will be explained in the following discussion, processor 215 executes logical instructions stored on memory 210, performing importation of reference images and annotations from imaging/input module 201 using annotation/reference importing module 211, transfer or map the annotations from one or more reference images to an image of a tissue section subject to dissection using registration and mapping module 212, meso-dissection of a milling slide of a tissue sample based on the annotations using milling module 213, and perform tracking of every step of the process from importation of reference information to output of milled tissue into a labeled container for analysis using tracking module 214.

Data received from imaging/input 201, or "input data" includes one or more reference images. The reference images may be scanned at any magnification level specified by a user, and may depict from any type of biological feature, such as H&E or any other IHC, ISH, cytology (urinal, blood smear thin prep, air dried, touch prep, cell block) CTC, and/or hematology slide of interest. The input data may also include annotations for the imported images. The annotations may have been generated on an external digital pathology workstation prior to being input into system 200. For example, the annotations may be generated on a whole-slide image management system such as VIRTUOSO® or SCANSCOPE® as a .XML file or annotation data being imported from a server or from a data storage from a network server in the form of JSON or a binary data or any text format compatible with module 211 and 212 and received by annotation/reference importing module 211. Annotations may be generated using image analysis algorithms for detecting and/or segmenting objects or areas of interest within the reference image(s). Annotations may depict clinically relevant regions such as immune, tumorous regions or tumor sub-regions where a particular biomarker expression or group of biomarker expressions is high. The annotations can be either the complete or sub-regions of tumor or any other biologically meaningful non-tumor components, such as a lymphatic region, heterogeneous regions, IHC marker sub-type regions, etc. Automated image analysis algorithms may detect desired tissue types such as tumors, lymphatic regions in H&E slide, etc., or hot spots of high marker expression in IHC stained slides like any tumor, immune or vessel markers tumor markers, immune markers, etc.

Besides reference images and annotations, the input data received via imaging/input module 201 may include information about a target tissue type or object, as well as an identification of a staining and/or imaging platform. Input information may further include which and how many specific antibody molecules bind to certain binding sites or targets on the tissue, such as a tumor marker or a biomarker of specific immune cells. Additional information input into system 200 may include any information related to the staining platform, including a concentration of chemicals used in staining, a reaction times for chemicals applied to the tissue in staining, and/or pre-analytic conditions of the tissue, such as a tissue age, a fixation method, a duration, how the sample was embedded, cut, etc.

Annotation/reference importing module 211 receives the reference images and annotations and prepares them to be registered and/or mapped to a live image of a milling slide via registration and mapping module 212. The milling slide may be a tissue slide that is intended to be dissected. For example, the annotations may be imported as a .XML file, or any combination of an XML and image file, enabling the annotations to be translated to a format that enables mapping the annotations to the image of the milling slide. The annotation data may include any geometric information about polygons, rectangles, circles, or ellipses, free hand drawings, labelled region masks, and contours of the annotations, including and excluding regions or areas of interest. Annotations from a plurality of reference images may be imported, enabling multiple areas of interest to be dissected from a milling slide. Annotations drawn at different magnifications and resolutions may be imported. For instance, annotations drawn on a high resolution (20× or 40×) image may be imported to improve the quality of milling. Annotations may further be generated within system 200 itself by, for instance, using an automated image analysis algorithm as described above. The annotations on the reference slides can be either manually generated, automatically generated by other image analysis algorithms or a mixture of manual and algorithm generated. Similarly, the annotations sent for milling on the milling slide can any combination of annotations a) which are mapped from the reference slide, b) user drawn and c) automatically generated by an image analysis algorithm. Moreover, the ability to input high-resolution reference slide, its associated annotations, and import them into the existing meso-dissection system, enables registering or mapping the imported and any manual or automated edits done to them on the meso-dissection system annotations to a live image acquired of a milling slide, thereby generating milling annotations at a resolution appropriate for the milling slide.

Tracking module 214 keeps track of any information associated with the tissue block and tissue slides (like the patient information from laboratory information systems (LIMS), clinical or research study information about the biological specimen, staining platform and staining protocols information, digital scanning information), the imported reference images and corresponding annotations, the milling slide image and the specific milling annotations that are associated with specific milling operations performed by milling module 213, milled tissue containers that collect the milled tissue from different annotated regions individually or together, and molecular and genetic sequence analysis conducted thereof, either individually or in combination and associated reports, as further described with respect to FIG. 4. Prior to milling, registration and mapping module 212 maps the annotations from each reference slide to the live image of the milling slide. This automated registration may use one or more of the inter-marker or same-marker registration methods described herein and in the references incorporated above. For instance, a same-marker registration method is used if the reference and milling slide are the same slide or of the same stain type. Importing reference images and annotations eliminates the need to load a reference slide into an imaging platform of existing meso-dissection systems. Only the image data and annotations may be imported from an external system. Moreover, universal importation of annotations from differently-stained reference slides enables meso-dissection of not only unstained tissue slides, but also stained tissue slides, once the coverslip is removed. In some embodiments of the subject disclosure, the same tissue that is used as a reference image may also be used for milling purposes. Additionally, the ability to import multiple reference images along with their annotations enables mapping of annotations from multiple reference images to a single or multiple milling slides for tissue dissection. For example, given a tissue block from a patient where multiple individual biomarker slides such as H&E, ER, PR, HER2, ISH, etc. may be digitized and annotated individually, any desired combination of these images and associated annotations can be imported and automatically registered and mapped to the image of the milling slide. In addition to mapping annotations from reference images to milling slide images, registration and mapping module 212 may provide an interface to fine-tune or adjust the annotations prior to milling.

Milling module 213 performs dissection on the milling slides by following the annotations mapped from the reference image(s) to the live image of the milling slide. The live image of the milling slide may be captured by another imaging device (not shown) in communication with milling module 213. Milling module 213 may further determine the necessary metrics for milling, including determining an optimal milling path on the milling slide based on the annotations, as well as determining a required diameter of the pipette and optimal volume of liquid to be dispensed for the tissue intended for dissection. This automated milling based on milling annotations generated from the registration and mapping of the reference annotations reduces the burden of a technician or human operator manually annotating the milling slide image. Moreover, to enable flexible functionality and for different purposes, milling module 213 may invoke registration/mapping module 212 to map back the milling annotations (i.e. the regions that are dissected from the milled slides) to the reference slides. These milled regions can be clearly indicated and graphically overlaid on each of the reference images. The mapped milled annotations may be used to assist with selection of additional regions for tissue analysis or annotation of more regions for further milling. Such mapping back may be enabled by storing the milled annotations to memory 210, and retrieving and registering back to the reference slides already used or for any other additional set of tissue slides from adjacent serial sections. The milled annotations are specified on the live image, thus in the camera coordinate system of the meso-dissection system, i.e. the same camera used to capture the live image of the milling slide, in contrast to the coordinate system of the camera originally used to generate the reference images. Any adjustments that are performed to the milling annotations prior to or during the milling process may be registered back to the original reference slide(s). Therefore, the annotation and registration across platforms is improved. Moreover, the slide being milled may be the same as the slide used to generate the reference image, enabling the annotations from milling to be updated back to the reference image annotations, enabling a more accurate annotation on the reference image. To map back the milling annotations from the milled image to each of the reference images, the automated registration operations described herein may be invoked. The milled image and the milled annotations are also part of tracked information.

As described above, the modules include logic that is executed by processor 105. "Logic," as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 210 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

Figure 3:
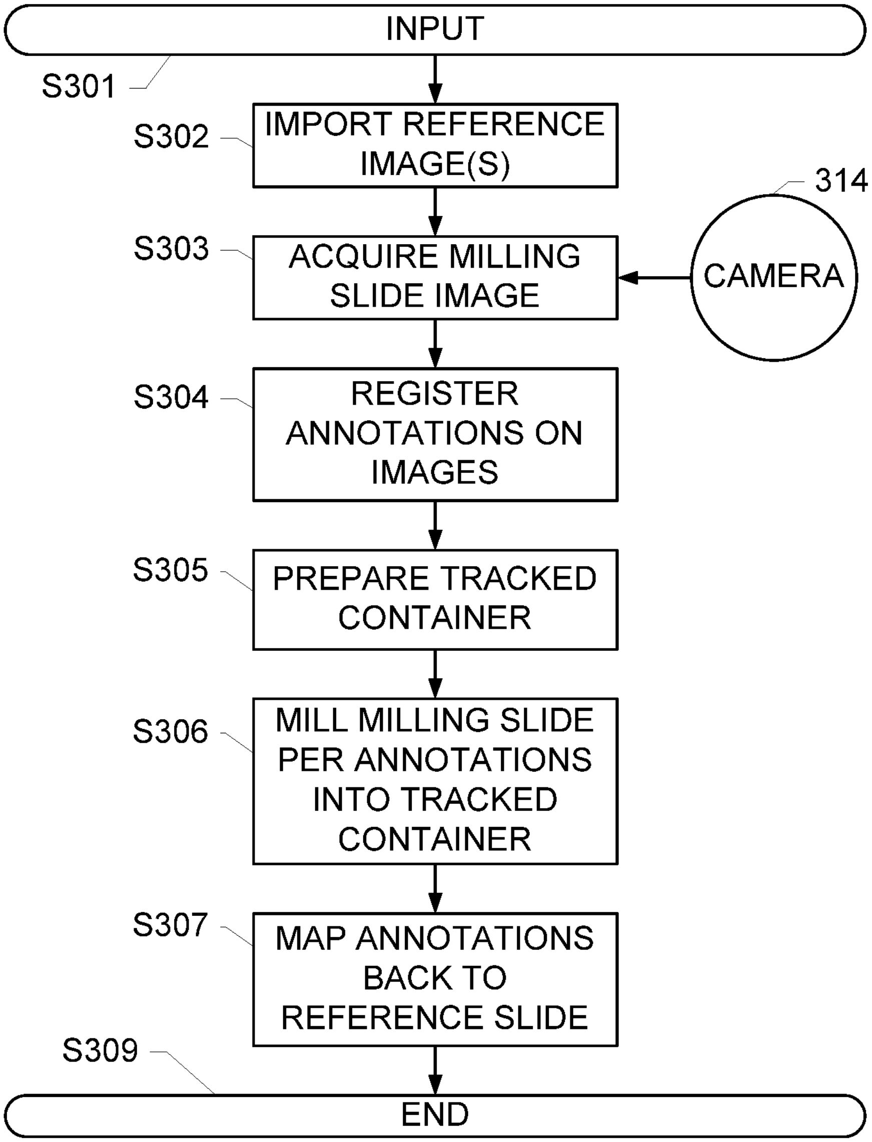
FIG. 3 depicts a method for automated meso-dissection, according to an exemplary embodiment of the subject disclosure.

FIG. 3 depicts a method for automated meso-dissection, according to an exemplary embodiment of the subject disclosure. The method of FIG. 3 may be executed by any combination of the modules depicted in FIG. 2, or any other combination of modules. The steps listed in this method need not be executed in the particular order shown. The method may begin with an input S301 of any combination of: a biological question/requested diagnosis by a pathologist, patient or biological specimen information enabling tracking, and annotated (or non-annotated) reference images of tissue sections associated with the tissue specimen (tissue block, patient, xenograft, etc.). The reference images may be scanned at any magnification level specified by a pathologist, and may depict from any type of biological feature, such as H&E or any other IHC, ISH, cytology (urinal, blood smear thin prep, air dried, touch prep, cell block) CTC, and/or hematology slide of interest. The input data may also include annotations for the reference images.

Annotations of input reference images are imported (S302). The annotations may have been generated on an external digital pathology workstation prior to being imported. Annotations may be generated using image analysis algorithms for detecting and/or segmenting objects or areas of interest within the reference image(s). Annotations may depict clinically relevant regions such as immune or tumor regions where the particular biomarker expression is high. The annotations can be either the complete or sub-regions of tumor or any other biologically meaningful non-tumor components, such as a lymphatic region, heterogeneous regions, IHC marker sub-type regions, etc. Automated image analysis algorithms may detect desired tissue types such as tumors, lymphatic regions in H&E slide, etc., or hot spots of high marker expression in IHC stained slides like any tumor, immune or vessel markers tumor markers, immune markers, etc. The annotations may be prepared to be registered and/or mapped to a live image of a milling slide. For example, the annotations may be imported as a .XML file, or any combination of an XML and image file, enabling the annotations to be translated to a format that enables mapping the annotations to the image of the milling slide.

Annotations from a plurality of reference images may be imported, enabling multiple areas of interest to be dissected from a milling slide. For example, the annotations for milling can be generated from a permutation or combination of annotations specified on one or multiple reference slides. The milling annotations may be user-specified, tissue type specific, and problem specific—i.e. generated to answer a particular biological question (like tumor heterogeneity, IHC4, immune scoring, tumor region analysis, peri-tumoral regional analysis, evaluation of tumor microenvironment, etc.) in a particular tissue type such as breast cancer, lung cancer, prostate cancer, colorectal cancer etc. For example, if co-expression analysis is important, the individual marker annotations are specified on each of the marker reference slides. In this case, the milling annotations, to indicate the specific regions for co-expression analysis, are a logical intersection of these annotations from multiple individual slide annotations. Similarly, if the biological interest is an inclusion of all the annotated regions from all markers, the milling annotations are a logical union of all the individual reference slide(s) annotations. For example, for a breast cancer patient, a typical series of IHC slides includes an H&E slide, a ER marked slide, a KR and PR marked slide, a Ki-67 marked slide, and an HER2-marked slide, each one having separate annotations for the expression of their respective markers. In the H&E slide, for instance, tumor and lymphatic regions may be annotated. A pathologist or biologist may be interested in a region that is ER positive and PR negative, or where all the markers are PR positive and Ki-67 negative, or any logical combination of regions for analysis. Multiple combinations of these constraints may be specified in order to automatically generate milling annotations. In another example, given an H&E slide associated with a tissue block, an adjacent serial section of a BRAFV600E-stained IHC slide, and an adjacent serial section PTEN-stained IHC slide, and a biological question to identify regional areas where there is expression of BRAFV600E and no expression of PTEN, the method can respectively identify the BRAFV600E-expressing regions (from the BRAFV600E slide) and PTEN non-expressing regions (from the PTEN slide), and identify regions where these areas overlap on the H&E slide. A resultant milling annotation would include these overlapping areas to be meso-dissected on the H&E slide. Any combinations of tumor markers or a combination of expressions (such as positive/negative) may be specified to further understand the tumor environment of the tissue specimen. Thus, as dictated by the underlying biological problem, several logical permutations and combinations of annotations can be used to construct the set of milling annotations. The milling annotations are the ones that get used by a milling system to extract the tissue from each of the milling slides into the specified tissue containers as further described herein. Moreover, annotations drawn at a higher magnification levels imported with the reference slides and used to generate the milling annotations ensure that a higher-quality milling operation is performed with minimal corruption of raw data (milled tissue) for analysis.

A milling slide is set up on a milling stage or platform, and imaged (S303) using a camera 314 coupled to the milling stage or platform. The milling image is typically a live capture. The milling slide may be any tissue slide, either unstained, or stained, and may be the same as the tissue slide used to generate one or more of the reference images. Annotations imported in step S302 may be registered (S304) and mapped to the live image of the milling slide. This automated registration may use one or more of the inter-marker or same-marker registration methods described herein and in the references incorporated above. For instance, a same-marker registration method is used if the reference and milling slide are the same slide or of the same stain type. Moreover, universal importation of annotations from differently-stained reference slides enables meso-dissection of not only unstained tissue slides, but also stained tissue slides, once the coverslip is removed. In some embodiments of the subject disclosure, the same tissue that is used as a reference image may also be used for milling purposes. Additionally, the ability to import multiple reference images along with their annotations enables mapping of annotations from multiple reference images to a single or multiple milling slides for tissue dissection. For example, given a tissue block from a patient where multiple individual biomarker slides such as H&E, ER, PR, HER2, ISH, etc. may be digitized and annotated individually, any desired combination of these images and associated annotations can be imported and automatically registered and mapped to the image of the milling slide. In addition to mapping annotations from reference images to milling slide images, an interface may be provided to fine-tune or adjust the annotations prior to milling.

A container may be prepared (S305) to receive the milled tissue from the milling operation. The container may be labeled with an identifier unique to a record of the biological specimen under diagnosis, enabling tracking of the milled tissue along with association of the milled tissue with the particular annotation and reference slide. This ensures that each imported reference image and annotation is properly associated with specific milling operations and resulting milled tissue, all of which may be associated with an electronic patient record. The milling slide may be dissected (S306) based on the milling annotations, using metrics such as an optimal milling path on the milling slide or a required diameter of the pipette and optimal volume of liquid to be dispensed for the tissue intended for dissection, based on the milling annotations. As described above, several logical permutations and combinations of input annotations can be used to construct the set of milling annotations that are used by milling operation (S306) to drill and extract the tissue from the milling slide into the specified tissue container or a set a tissue containers. The dissected tissue may be milled into the particular container labeled in association with the particular annotation to ensure proper tracking of the tissue and the associated analysis thereof.

Any combination of milling operations performed on the milling slide may be converted into annotations and mapped back (S307) into one or more of the reference slides. For example, an annotation from a first reference slide may be used to mill the milling slide, and the same annotation may be mapped back to a second reference slide, or to the same reference slide. Combinations of annotations from multiple reference slides may be milled and subsequently mapped back to a single reference slide. The updated reference slide annotations may be used to assist with selection of additional regions for tissue analysis or annotation of more regions for further milling. Such mapping back may be enabled by tracking and storing the milled annotations and retrieving and registering back to the reference slides already used or for any other additional set of tissue slides from adjacent serial sections. The method ends (S309) by unloading the tracked container with the milled tissue.

Figure 4A:
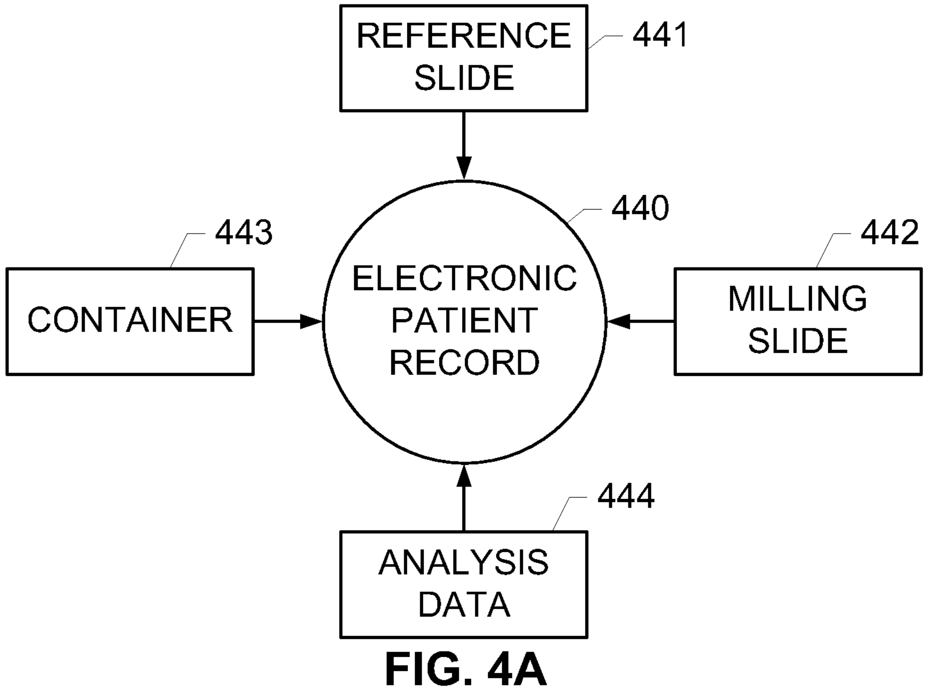
FIGS. 4A-4B depict tissue and information that is tracked and associated with an electronic patient record (EPR), according to an exemplary embodiment of the subject disclosure.
Figure 4B:
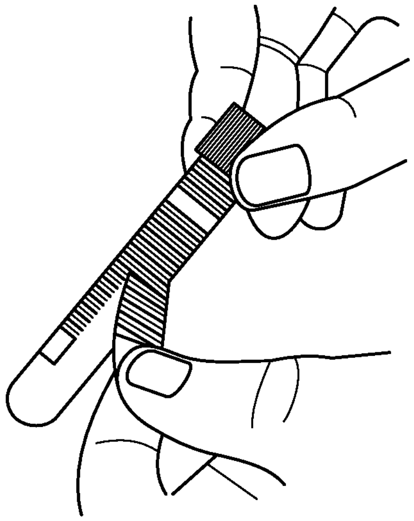

FIG. 4A depicts information that is tracked and associated with an electronic patient record (EPR), according to an exemplary embodiment of the subject disclosure. As described herein, patient data and information may be tracked by bar-coding (or using an equivalent unique labeling system) every component of the above-described workflows and recording them in an EPR 440. For example, a reference slide and its corresponding annotations 441 is associated with EPR 440. The milling slide 442 that corresponds to the same serial section as the reference slide 441 is also associated with EPR 440. Importantly, the container 443 that is used to receive the milled tissue from milling slide 442 is tracked using the same bar code or as associated set of bar codes, and any resulting analysis data 444 of the milled tissue is also tracked with the same bar code. Therefore, a single EPR 440 maintains all analytic and process information that is enhanced using the accurate annotation registering and milling operations described herein. FIG. 4B depicts a barcoded container of extracted or dissected tissue sample. Although barcodes are described herein, other methods for tracking and/or tagging may be used, such as RFID, etc.

The disclosed operations therefore mitigate tedious manual transcription of annotations on existing milling systems, while avoiding errors based on mixing up or corrupting tissue-specific analysis data, therefore making the overall system robustly operational in a high-volume usage in pre-clinical and clinical settings and in drug discovery and drug development experimental studies. Moreover, besides medical applications such as anatomical or clinical pathology, prostrate/lung cancer diagnosis, etc., the same methods may be performed to analysis other types of samples such as remote sensing of geologic or astronomical data, etc. The operations disclosed herein may be ported into a hardware graphics processing unit (GPU), enabling a multi-threaded parallel implementation.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores." In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers." In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

In one embodiment, disclosed is a tangible non-transitory computer-readable medium to store computer-readable code that is executed by a processor to perform operations comprising: automatically registering a plurality of reference annotations with a live-captured image of a tissue sample to be dissected, wherein the plurality of reference annotations are imported from a whole-slide scanner; and generating a milling annotation for dissection of the tissue sample based on the results of the automatic registration.

In another embodiment, disclosed is a computer-implemented method for meso-dissection comprising the steps: importing a reference image along with one or more annotations, wherein the reference image was digitized from a reference slide scanned on a whole-slide scanner and wherein the annotations were generated using a whole slide viewer interface coupled to the whole-slide scanner; and automatically registering said one or more annotations onto a live capture of a tissue specimen slide to be milled; wherein tissue is extracted from the tissue specimen slide is dissected based on the one or more annotations, resulting in a milled tissue sample.

In yet another embodiment, disclosed is a computer-implemented method for meso-dissection comprising the steps: automatically registering a plurality of reference annotations with a live-captured image of a tissue sample to be dissected, wherein the plurality of reference annotations are imported from a whole-slide scanner; and generating a milling annotation for dissection of the tissue sample based on the results of the automatic registration.

The invention claimed is:

1. An instrument for meso-dissection, comprising:

a processor; and a memory coupled to the processor, the memory to store computer-readable instructions that, when executed by the processor, cause the processor to perform operations comprising:

registering one or more annotations derived from one or more reference images onto a milling image, wherein the milling image is derived from a milling specimen disposed on a milling slide, wherein at least one of the one or more reference images are stained for the presence of one or more biomarkers and/or stained with hematoxylin and/or eosin, and wherein the one or more reference images and the milling image are derived from one or more serial sections of a biological specimen; and dissecting one or more portions of the milling specimen disposed on the milling slide based on the annotations registered to the milling image, wherein the milling specimen is stained differently than the one or more reference images.

2. The instrument of claim 1, wherein the one or more annotations are automatically registered from the one or more reference images onto the milling image.

3. The instrument of claim 1, wherein the one or more annotations comprise an identification of one or more tumor regions.

4. The instrument of claim 1, wherein the one or more annotations comprise an identification of one or more non-tumor components.

5. The instrument of claim 4, wherein the non-tumor components are selected from the group consisting of lymphatic regions and heterogeneous regions.

6. The instrument of claim 1, wherein the one or more annotations comprises an identification of high biomarker expression.

7. The instrument of claim 1, wherein the dissecting of the one or more portions of the milling specimen is performed automatically.

8. The instrument of claim 1, further comprising operations to determine a milling path based on the annotations registered to the milling image.

9. The instrument of claim 8, further comprising mapping the milling path back to the one or more reference slides.

10. The instrument of claim 9, further comprising generating an overlay of the milling path and superimposing the overlay onto the one or more reference images.

11. The instrument of claim 1, wherein the one or more reference images and the milling image are derived from the same serial section of the biological specimen.

12. The instrument of claim 1, wherein the registration comprises inter-marker registration.

13. The instrument of claim 1, wherein the registration comprises a line-based registration method.

14. The instrument of claim 1, wherein the one or more reference images comprise different resolutions.

15. The instrument of claim 1, wherein two or more reference images derived from two or more different serial sections are registered to the milling image, wherein a first of the two or more reference images is stained with H&E, and wherein a second of the two or more reference images is stained with an immunohistochemical stain.

16. The instrument of claim 1, wherein two or more reference images derived from two or more different serial sections are registered to the milling image, wherein a first of the two or more reference images is stained with H&E or stained for the presence of one or more biomarkers, and wherein a second of the two or more reference images is unstained.

17. The instrument of claim 1, wherein the milling specimen is unstained.

18. A tangible non-transitory computer-readable medium to store computer-readable code that is executed by a processor to perform operations comprising: importing a plurality of annotated reference images, wherein each annotated reference image of the plurality of annotated reference images includes one or more reference annotations; selecting, by a user interface, a permutation or combination of the one or more reference annotations from at least one of the plurality of annotated reference images; generating a milling annotation for milling a tissue specimen based on the selected permutation or combination of reference annotations; and milling the tissue specimen using the generated milling annotation, wherein the milling annotation is generated based on automatic registration of an annotation generated on an external whole-slide scanner on to a live capture of the tissue specimen.

19. The tangible non-transitory computer-readable medium of claim 18, further comprising mapping the milling annotation back to at least one of the plurality of annotated reference images to generate an updated reference annotation.

20. A tangible non-transitory computer-readable medium to store computer-readable code that is executed by a processor to perform operations comprising: automatically registering a plurality of reference annotations with a live-captured image of a tissue sample to be dissected, wherein the plurality of reference annotations are imported from a whole-slide scanner; generating a milling annotation for dissection of the tissue sample to be dissected based on the results of the automatic registration; determining, based on the generated milling annotation, one or more milling metrics; and dissecting the tissue sample based on the determined one or more milling metrics.

21. The tangible non-transitory computer-readable medium of claim 20, wherein the one or more milling metrics include at least one of (i) a milling path on a milling slide, (ii) a diameter of a pipette, and (iii) a volume of liquid to be dispensed for tissue intended for dissection.

* * * * *